(12) United States Patent  (10) Patent No.: US 12,511,954 B1
Herron  (45) Date of Patent: Dec. 30, 2025

(54) VEHICLE DIAGNOSTIC SYSTEM AND METHOD FOR CATEGORIZING AND REPORTING FAULT CODES

(71) Applicant: Opus IVS, Inc., Ann Arbor, MI (US)

(72) Inventor: Brian J. Herron, Dexter, MI (US)

(73) Assignee: Opus IVS, Inc., Dexter, MI (US)

( * ) Notice: Subject to any disclaimer, the term of this patent is extended or adjusted under 35 U.S.C. 154(b) by 91 days.

(21) Appl. No.: 17/743,060

(22) Filed: May 12, 2022

(51) Int. Cl.
*G07C 5/08* (2006.01)

(52) U.S. Cl.
CPC ....... *G07C 5/0808* (2013.01); *G07C 2205/02* (2013.01)

(58) Field of Classification Search
CPC .......................... G07C 5/0808; G07C 2205/02
See application file for complete search history.

(56) References Cited

U.S. PATENT DOCUMENTS

| | | | |
|---|---|---|---|
| 4,739,323 A | 4/1988 | Miesterfeld et al. | |
| 6,212,449 B1* | 4/2001 | Wellman | B66F 9/24 701/31.8 |
| 10,706,645 B1 | 7/2020 | Herron et al. | |
| 11,257,307 B1 | 2/2022 | Herron et al. | |
| 11,348,382 B1 | 5/2022 | Herron et al. | |
| 11,508,191 B1 | 11/2022 | Herron et al. | |
| 11,538,290 B1 | 12/2022 | Herron | |
| 11,842,582 B2* | 12/2023 | Palai | G05B 19/0421 |
| 11,861,954 B2 | 1/2024 | Jurmo et al. | |
| 11,948,410 B1 | 4/2024 | Herron et al. | |
| 11,954,946 B1 | 4/2024 | Herron et al. | |
| 2004/0104814 A1* | 6/2004 | Christensen | B60L 53/66 340/426.16 |
| 2008/0306645 A1 | 12/2008 | Dewhurst et al. | |
| 2009/0271239 A1* | 10/2009 | Underdal | G06Q 10/20 705/305 |
| 2010/0205450 A1 | 8/2010 | Sarnacke et al. | |
| 2011/0112718 A1 | 5/2011 | Claus et al. | |

(Continued)

FOREIGN PATENT DOCUMENTS

KR 20150117561 A * 4/2014

OTHER PUBLICATIONS

Commonly assigned U.S. Appl. No. 17/177,927, filed Feb. 17, 2021.

(Continued)

*Primary Examiner* — Daryl C Pope
(74) *Attorney, Agent, or Firm* — Gardner, Linn, Burkhart & Ondersma LLP

(57) ABSTRACT

A method and system of diagnosing a vehicle electrical system and categorizing fault codes includes using a vehicle diagnostic computer tool that is configured to be connected to a diagnostic port of a vehicle to be in communication with an electronic system of the vehicle and running a diagnostic application program with the vehicle diagnostic computer tool to determine fault codes present in the electronic system of the vehicle. The method and system further include processing the fault codes with a fault code evaluation program to categorize the fault codes into collision fault codes that are deemed to have resulted from collision damage to the vehicle or mechanical fault codes that are deemed to not have resulted from collision damage to the vehicle. The vehicle diagnostic system generates a report file listing the fault codes as categorized.

20 Claims, 4 Drawing Sheets

(56) References Cited

U.S. PATENT DOCUMENTS

| | | | |
|---|---|---|---|
| 2014/0288761 A1* | 9/2014 | Butler ................. | G07C 5/0816 |
| | | | 701/29.6 |
| 2015/0039397 A1* | 2/2015 | Fuchs ............... | G06Q 30/0283 |
| | | | 705/7.35 |
| 2017/0301154 A1 | 10/2017 | Rozint | |
| 2019/0228322 A1* | 7/2019 | Wenner ............... | G07C 5/0808 |
| 2019/0385385 A1* | 12/2019 | Davidson ............. | G07C 5/0808 |
| 2020/0334927 A1* | 10/2020 | Rozint ............... | B60R 21/0136 |
| 2021/0354707 A1 | 11/2021 | Patnala et al. | |
| 2023/0161583 A1* | 5/2023 | Fang .................... | B60R 16/023 |
| | | | 701/36 |
| 2024/0212403 A1* | 6/2024 | Rozint ................ | G07C 5/0808 |
| 2025/0085703 A1* | 3/2025 | Pasupureddy ..... | G05B 23/0235 |

OTHER PUBLICATIONS

Commonly assigned U.S. Appl. No. 17/515,516, filed Oct. 31, 2021.
Commonly assigned U.S. Appl. No. 17/509,316, filed Oct. 25, 2021.
United States co-pending application as filed, assigned U.S. Appl. No. 17/971,757, filed Oct. 24, 2022.

* cited by examiner

FIG. 5
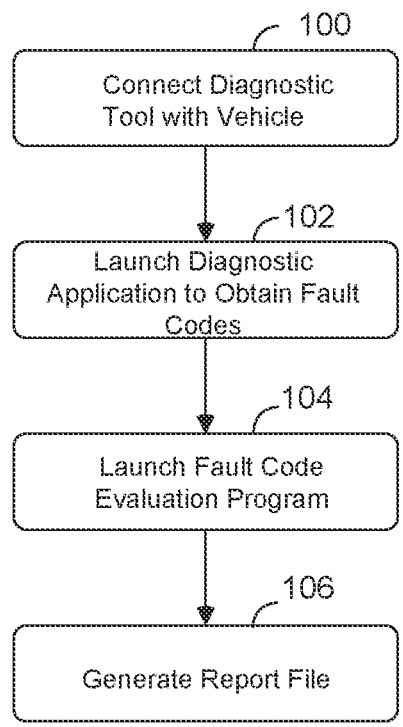
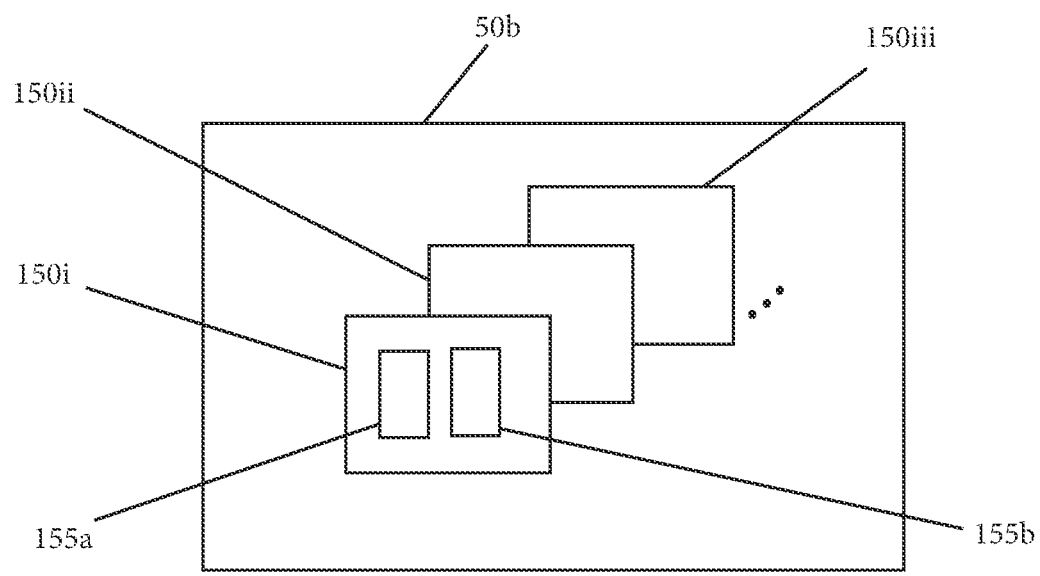
FIG. 4

VEHICLE DIAGNOSTIC SYSTEM AND METHOD FOR CATEGORIZING AND REPORTING FAULT CODES

BACKGROUND OF THE INVENTION

The present invention is directed to a vehicle diagnostic system and method, and in particular to a vehicle diagnostic system that analyzes fault codes obtained via a vehicle diagnostic scanning program, such as performed on a vehicle that has been involved in a collision, and categorizes the fault codes into one or more categories, including as being either a collision related fault code or a mechanical failure fault code.

Vehicle diagnostic systems employing diagnostic scan devices or tools are used in automotive repair facilities to diagnose and repair computer-based vehicle systems, including to repair vehicles that have been involved in collisions where the diagnostic scan is used to identify systems, components or areas of the vehicle that may require repair. Vehicle diagnostic scan systems may include or use one or more diagnostic software scanning programs or applications, such as applications developed by an OEM or an aftermarket diagnostic company for detecting fault codes in the electronic system of the vehicle, where the mechanic may then work to repair the vehicle, including based on the detected fault codes.

SUMMARY OF THE INVENTION

The present invention provides a vehicle diagnostic system and method, and in particular a diagnostic system that categorizes fault codes obtained from an electronic system of a vehicle as collision fault codes and/or mechanical fault codes, where the collision fault codes are deemed to have resulted from collision damage to the vehicle and the mechanical fault codes are deemed not to have resulted from collision damage to the vehicle.

In accordance with an embodiment of the invention, a method of diagnosing a vehicle electrical system includes providing a vehicle diagnostic system comprising a vehicle diagnostic computer tool that is configured to be connected to a diagnostic port of a vehicle to be in communication with an electronic system of the vehicle, running a diagnostic application program with the vehicle diagnostic computer tool to determine fault codes present in the electronic system of the vehicle, and processing the fault codes with a fault code evaluation program to categorize the fault codes into at least one category comprising collision fault codes that are deemed to have resulted from collision damage to the vehicle.

The method may further include processing the fault codes with the fault code evaluation program into at least two categories comprising the collision fault codes and further comprising mechanical fault codes that are deemed not to have resulted from collision damage to the vehicle. A fault code database of designated fault codes may be used to process the fault codes, where the fault code database may include collision designated fault codes and/or mechanical designated fault codes, where the processing of the fault codes with the fault code evaluation program to categorize the fault codes includes using the fault code database to categorize the fault codes.

In a still further aspect of the invention, an electronic file report is generated that includes a listing of the collision fault codes and the mechanical fault codes by category, where the electronic file report may be generated by the fault code evaluation program, such as via the vehicle diagnostic computer tool, and may be transmitted from the vehicle diagnostic computer tool to a remote computer. The diagnostic application programs and/or the fault code evaluation program may be retained on the vehicle diagnostic computer tool and/or may be retained on a remote computer.

The method and system may further comprise receiving damage information inputs with the vehicle diagnostic computer tool representative of damage to the vehicle, with the processing of the fault codes with the fault code evaluation program further comprising processing the fault codes based on the damage information inputs.

A vehicle diagnostic system for categorizing fault codes in an electronic system of a vehicle includes a vehicle diagnostic computer tool configured to be connected to a diagnostic port of a vehicle to be in communication with an electronic system of the vehicle and to operate in a mode to diagnose a vehicle using a diagnostic scan programs to determine fault codes in the electronic system of the vehicle, and includes a fault code evaluation program. The fault code evaluation program is operable to process the fault codes to categorize the fault codes as collision fault codes that are deemed to have resulted from collision damage to the vehicle and/or as mechanical fault codes that are deemed not to have resulted from collision damage to the vehicle.

The vehicle diagnostic system is further configured to generate an electronic file report that includes a listing of the fault codes by categories, such as a listing of the collision fault codes and the mechanical fault codes by category. In a particular embodiment the fault code evaluation program and/or the diagnostic application program are included in the diagnostic computer tool. Alternatively, the fault code evaluation program and/or the diagnostic application program are located on a remote computer. Still further, the vehicle diagnostic computer tool may be configured to receive damage information inputs representative of damage to the vehicle, with the fault code evaluation program being operable to categorize the fault codes based in part on the damage information inputs.

The vehicle diagnostic system and method of the present invention provides a fault code evaluation program for categorizing fault codes detected in a vehicle scan performed by a diagnostic tool on a vehicle that has sustained physical damage, such as by way of a collision. The automatic categorization of the fault codes enables an expedited uniform approach to the identification of vehicle repairs that may be attributed to the physical damage, thereby assisting an insurer or insurance adjuster to provide coverage for repairs resulting from the physical damage and avoid coverage of other vehicle issues that are not attributable to the physical damage. These and other objects, advantages, purposes and features of this invention will become apparent upon review of the following specification in conjunction with the drawings.

BRIEF DESCRIPTION OF THE DRAWINGS

FIG. 4 is an illustration of a database of designated fault codes for multiple vehicles by make, model and year useable in connection with the fault code evaluation program; and FIG. 5 is a flow chart illustrating operational aspects of the vehicle diagnostic system and method in accordance with the present invention by which a report file is generated in which detected fault codes are categorized.

DESCRIPTION OF THE PREFERRED EMBODIMENTS

The present invention will now be described with reference to the accompanying figures, wherein the numbered elements in the following written description correspond to like-numbered elements in the figures.

Figure 1:
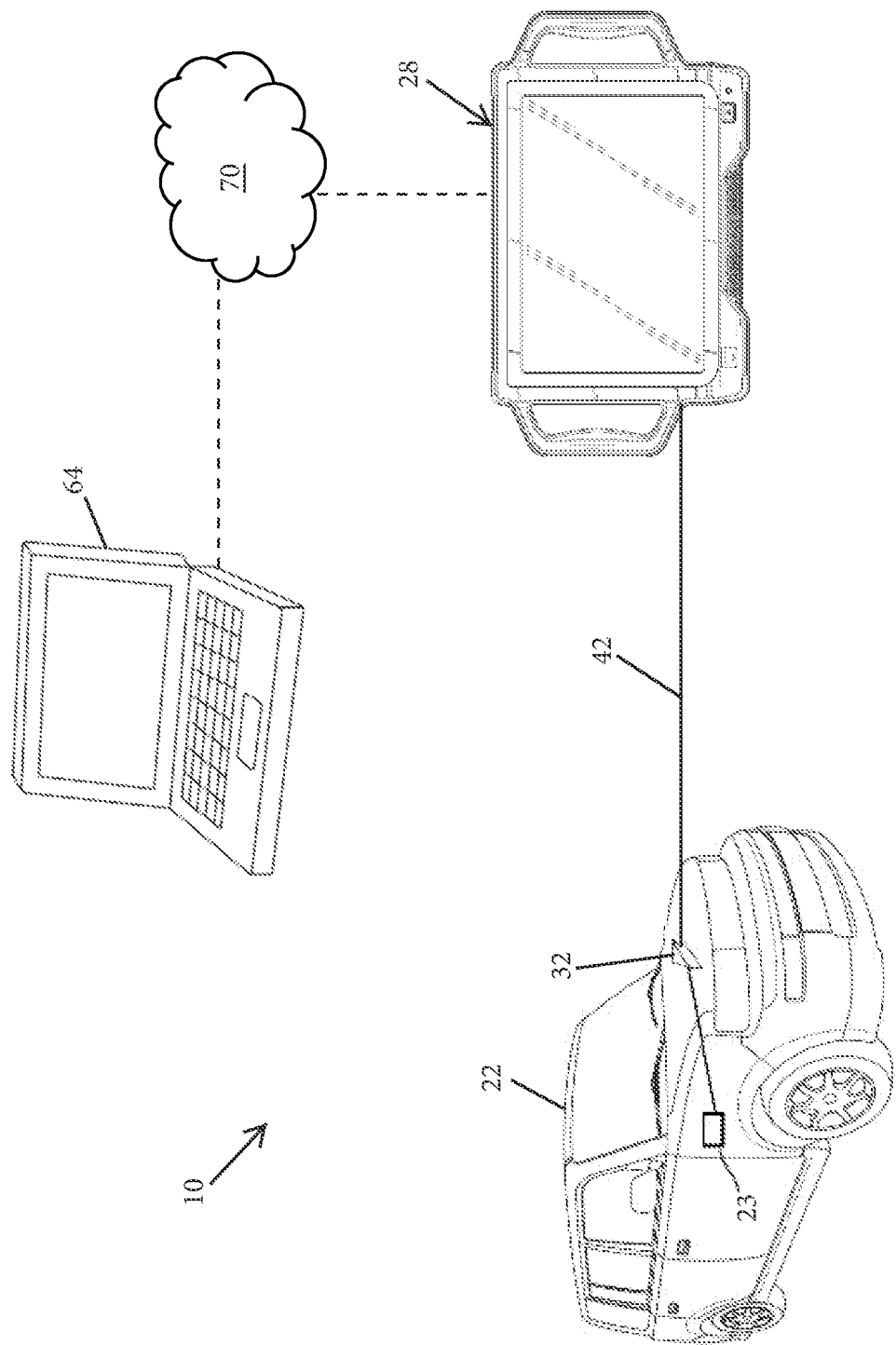
FIG. 1 is a diagram of a vehicle diagnostic system in accordance with the present invention showing a vehicle diagnostic tool connected to the electronic system of a vehicle for performing a diagnostic scan on the vehicle.
Figure 2:
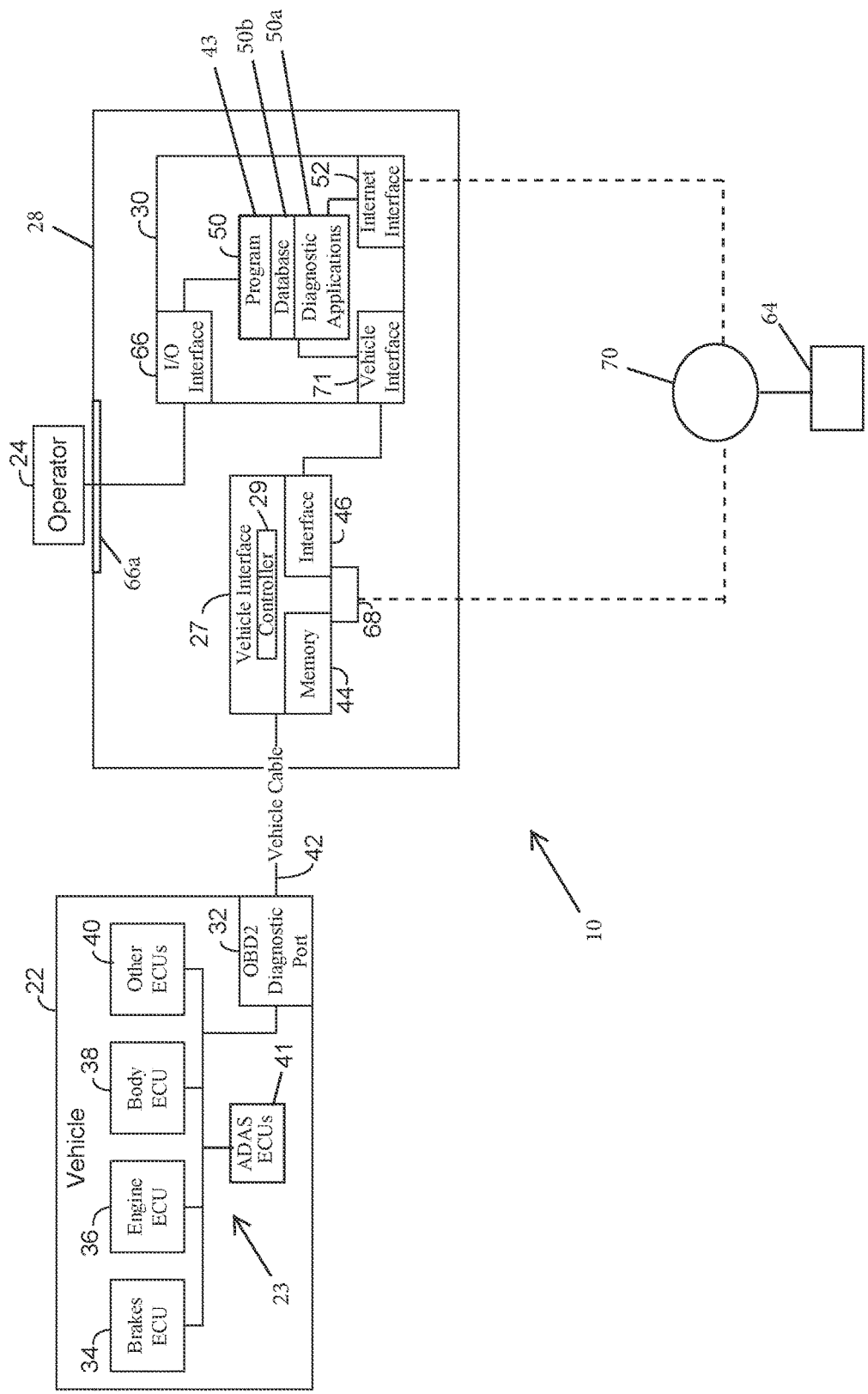
FIG. 2 is a block diagram of the vehicle diagnostic system in accordance with the present invention showing the diagnostic tool in relation to the electronic system of the vehicle.

A vehicle diagnostic system 10 for use with a vehicle 22 is shown for use by a user such as a mechanic or operator 24, such as in an automotive repair facility 11. System 10 is illustrated in FIGS. 1 and 2 as including a vehicle diagnostic tool 28, which as discussed in more detail below, is connected with vehicle 22 by operator 24 in order to diagnose the electronic system 23 of vehicle 22, including various vehicle electronic control units (ECUs), including safety systems such as Adaptive Driver Assistance Systems ("ADAS") ECUs, and including other electronic parts and components of vehicle 22. Vehicle diagnostic tool 28 is used to scan the electronic system 23 of vehicle 22, such as to determine any fault codes 25 that may be present in the electronic system 23, which may be reported as diagnostic trouble codes ("DTCs"). A vehicle scan may be run prior to repairs, such as part of an initial diagnosis after vehicle 22 has been in a collision or other type of accident or obtained physical damage to provide an indication to the mechanic 24 as to what repairs are needed on vehicle 22. As also discussed in more detail below, diagnostic system 10 includes a fault code evaluation or analysis program 43 that is operative to analyze or evaluate fault codes 25 determined from a vehicle scan and categorize the fault codes into groups or categories, where in the illustrated embodiment the fault codes may be categorized or designated as collision fault codes 25a or mechanical fault codes 25b. Fault codes 25 categorized as collision fault codes 25a are those deemed to have been generated or caused or resulted from a collision or some other form of physical damage to vehicle 22, whereas fault codes 25 categorized as mechanical fault codes 25b are those deemed to have been generated by or resulting from some other form of mechanical failure, such as wear or age related or some other form of non-collision mechanical failure. System 10 via fault code analysis program 43 thus categorizes the fault codes 25 whereby a report or report file 26 may be generated and provided, such as via the fault code analysis program 43, in which the determined fault codes 25 from the scan are categorized via program 43. In this way a determination may be made as to whether or which repairs to vehicle 22 to address the detected fault codes 25 are collision related and therefore to be covered by a vehicle insurance repair policy. For example, an insurance provider may cover the repair costs to vehicle 22 to address the causes of the fault codes 25 designated as collision fault codes 25a, but the insurance provider may not cover the costs to repair vehicle 22 to address the causes of the fault codes 25 designated as mechanical fault codes 25b. Advantageously in this way a mechanic 24 or an insurance estimator representing an insurance provider can more accurately evaluate the costs of repairs resulting from a collision and avoid incurring costs associated with repairs that are not properly attributed to a collision and thus not covered under a vehicle insurance policy.

As discussed in more detail below, in the illustrated embodiment of diagnostic system 10 the fault code evaluation program 43 is stored in a memory 50 of diagnostic tool 28. Vehicle diagnostic tool 28 in the illustrated embodiment includes a housing 28a containing circuitry, hardware and software, such as a vehicle interface module 27 coupled with a computer module 30. In use, tool 28 is connected with vehicle 22 by operator 24, such as by connecting to an on-board diagnostic ("OBD") diagnostic port 32 of the vehicle 22 in order to diagnose the electronic system 23 of vehicle 22, including the various noted vehicle electronic control units (ECUs), such as an engine ECU 34, body ECU 36, brakes ECU 38, and/or other ECUs 40, including for safety systems such as ADAS ECUs 41, and including other electronic parts and components of vehicle 22. Tool 28 connects with port 32, such as via vehicle cable 42. Vehicle diagnostic tool 28 includes a controller 29, such as in the form of a processor or micro-processor and interface circuitry to facilitate communication between the ECUs and tool 28, with tool 28 including a database of vehicle protocols found in a local memory 44 that allow communication with the ECUs of various makes and models of vehicles. Vehicle diagnostic tool 28 additionally includes interfaces 46, 71 for communication between interface module 27 and computer module 30, where computer module 30 additionally includes a controller and memory. Diagnostic tool 28 additionally includes a user interface 66, which in the illustrated embodiment comprises a touch screen 66a enabling mechanic 24 to enter information into diagnostic tool 28, as well as view information output by diagnostic tool 28. As understood from FIG. 2, vehicle diagnostic tool 28 may be connected to a remote computer, such as a server 64, such as by an Internet 70 connection. Although diagnostic tool 28 is shown in the illustrated embodiment as comprising an integrated interface module 27 and computer module 30, it should be appreciated that in an alternative system these components may be separate. For example, an alternative diagnostic tool may include the components and software of computer module 30, with the interface module comprising a separate device in which the two components are connected with a cable, such as a USB cable. Still further, some or all of the fault code evaluation program 43, diagnostic applications 50a and/or database 50b may reside on remote computer 64 and be accessible via Internet connection 70.

Vehicle diagnostic system 10 may be configured to be selectively operable in one of a plurality of different modes, whereby a technician may use the diagnostic tool 28 for vehicle maintenance, diagnosis, programming and repair as needed. In the illustrated embodiment, and as understood from FIG. 2 in accordance with an embodiment of the present invention, system 10 includes or provides access to diagnostic application scanning programs 50a, such as stored in memory 50 of diagnostic tool 28, where scanning programs 50a may be commercially available diagnostic application scanning programs that are configured for use with the specific vehicle 22 and may be used or selected by a mechanic 24, or may be selected via guidance provided by a separate program, such as provided by U.S. Pat. No. 11,257,307 and/or U.S. patent application Ser. No. 17/509,316 and/or U.S. patent application Ser. No. 17/515,516, all of which are incorporated herein by reference in their entireties. In the illustrated embodiment diagnostic application programs 50a may comprise an aftermarket scan program or an OE scan program, and it should be appreciated that system 10 may include multiple such programs available for use with a given vehicle 22 and/or including additional diagnostic application programs for use with other vehicles, depending on make, model and/or year of a given vehicle. Interface module 27 may be configured as an SAE standard J2534 device, such as a device compliant with the J2534-2 standard, or as an ISO compliant or other standard compliant device for supporting and enabling communication with the electronic systems of a vehicle.

As noted and illustrated in FIG. 2, the diagnostic application scanning programs 50a are stored in a memory 50 of diagnostic tool 28. An exemplary aftermarket diagnostic application scanning program comprises a program provided by an automotive manufacturer or a company that supplies diagnostic application programs, such as Snap-On Incorporated, and an OE diagnostic application scanning program comprises a program provided by a domestic or foreign OEM, such as Ford, General Motors, Toyota or the like, with the diagnostic application scanning tool 28 configured to enable the reading and reporting of fault codes 25 in the electronic system 23 of the vehicle 22 such as may be located in one or more of the various ECUs of the vehicle 22. As noted, in practice, memory 50 may include multiple diagnostic application programs, each for use with various makes and/or models of vehicles to enable diagnosing and programming of ECUs via vehicle interface module 27, including depending on the particular vehicle systems/ECUs on the vehicle installed by the OEM based on the vehicle purchaser's selection of vehicle options. Alternatively and/or additionally, memory 50 may include diagnostic application programs that may be used with multiple variations of vehicles. Vehicle interface module 27 and computer module 30 are thus cooperatively used for querying/scanning and diagnosing ECUs of vehicle 22, including for accessing error codes generated by the ECUs for assessing and diagnosing operational and performance related aspects of the vehicle 22.

As noted, the vehicle scan performed using diagnostic tool 28 and an application program 50a will result in fault codes 25 being detected by or reported to diagnostic tool 28, where the fault codes 25 may include DTCs from one or more of the various ECUs of vehicle 22, and/or may include other codes, such as restraint deployment codes indicating, for example, whether the airbags of vehicle 22 have been deployed and/or whether one or more of a seat belt tensioner or pretensioner has been activated or deployed. For example, some vehicles include electronic seat belt pretensioners that utilize an explosive charge and include an ECU for providing tension to a seatbelt in the event a collision is detected. Accordingly, diagnostic tool 28 may be used to detect trouble codes indicating deployment of such safety systems.

Upon obtaining the fault codes 25 via the diagnostic scan using diagnostic tool 28 and an application program 50a, fault code evaluation program 43 is used to categorize the fault codes 25 into groups by classifying, analyzing or evaluating the fault codes, where in the illustrated embodiment the fault codes may be categorized or designated as collision fault codes 25a or mechanical fault codes 25b. As noted, collision fault codes 25a are those deemed to have been generated or caused or resulted from a collision or some other form of physical damage to vehicle 22, whereas mechanical fault codes 25b are those deemed to have been generated by or resulting from some other form of mechanical failure, such as wear or age related or some other form of mechanical failure. Examples of fault codes 25 that may be designated as collision fault codes 25a include, but are not limited to, fault codes related to circuit faults, missing headlamps, airbag codes, wiring faults, bumper sensors and the like. Examples of fault codes 25 that may be designated as mechanical fault codes 25b include, but are not limited to, oxygen sensors, catalyst codes, slipping transmission codes, and engine misfires. Mechanical fault codes 25b may additionally include, for example, power door lock actuators and power window fault codes, particularly if the physical component generating the code is not in an area of a collision, and may include motor engine sensor codes, particularly if such motor engine sensors are ones that may be known to commonly wear out on a particular vehicle make and model. Accordingly, it should be appreciated that fault codes may be categorized or designated as collision or mechanical related based on an understood potential failure mode or potential failure mode for the electronic component associated therewith.

Figure 3:
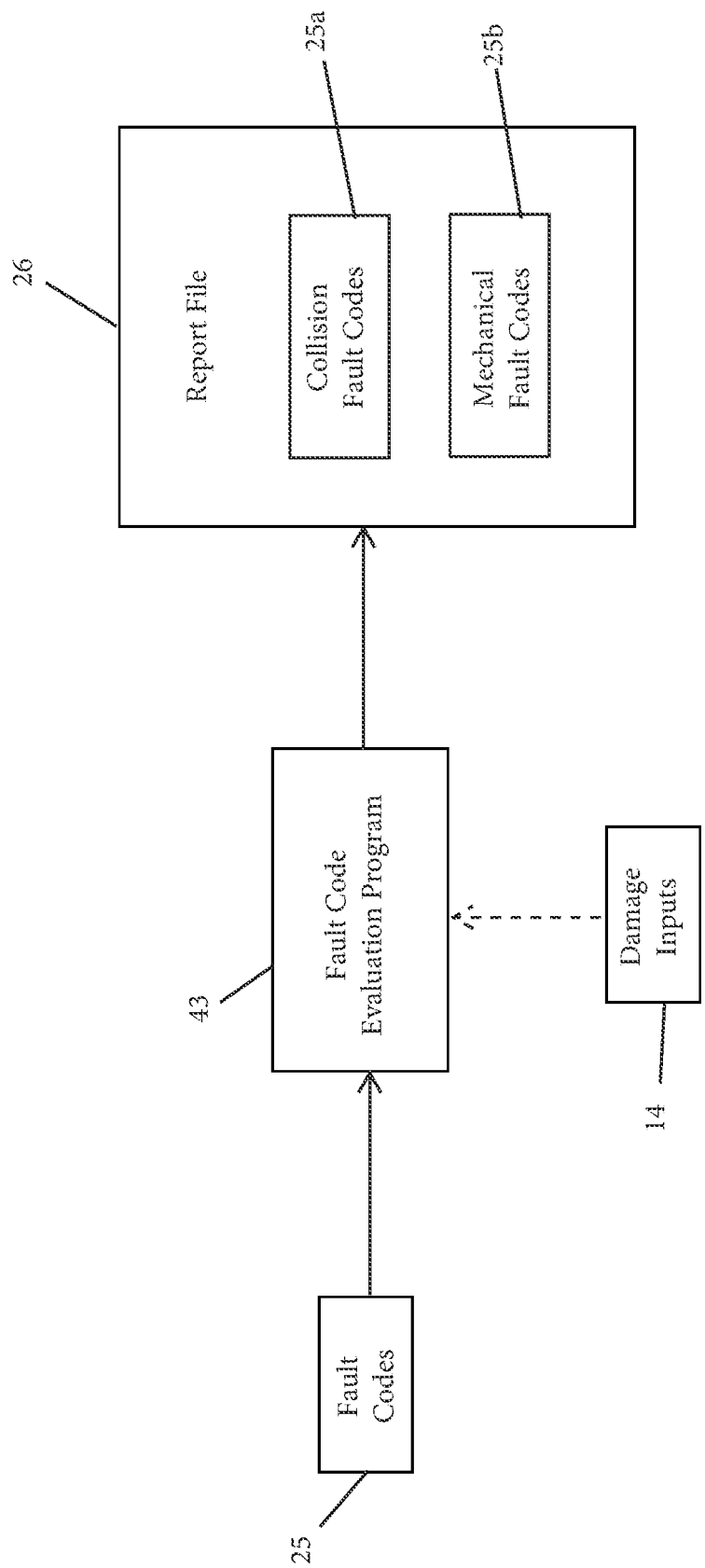
FIG. 3 is a block diagram illustrating operation of a fault code evaluation program of the vehicle diagnostic system of FIG. 1 in accordance with an aspect of the present invention.

As illustrated in FIG. 3, the determined fault codes 25 from a vehicle scan are processed or analyzed using fault code evaluation program 43 to categorize the fault codes 25 into collision fault codes 25a or mechanical fault codes 25b. Various approaches may be employed using fault code evaluation program 43 for categorizing the determined fault codes 25 from a vehicle scan into collision fault codes 25a or mechanical fault codes 25b. For example, in one embodiment fault code evaluation program 43 may categorize fault codes 25 based on a predetermined designation for possible fault codes that may be detected. This may include, for example, all possible fault codes, such as all possible fault codes for a given make, model and/or year of vehicle 22. Diagnostic tool 28 may include a database 50b in memory 50 listing possible fault codes in which each of the fault codes are designated within database 50b as being either a collision fault code or a mechanical fault code. Upon receiving fault codes 25 from a vehicle scan, fault code evaluation program 43 may access database 50b to categorize the fault codes 25 according to the designation within database 50b. This may comprise, for example, operations in which detected fault codes 25 from a scan are matched or correlated with a corresponding designated fault code within database 50b to categorize the particular detected fault code 25 pursuant to the associated designation within database 50b. In turn, a report file 26 is generated in which the fault codes 25 are categorized as being either a collision fault code 25a or a mechanical fault code 25b. Alternatively, rather than residing in a separate database 50b, designations or classifications of fault codes as being either a collision fault code or a mechanical fault code may reside within fault code evaluation program 43 itself, such as in a database or lookup table. Still further, a similar such database or lookup table may be retained in a remote computer 64, with diagnostic tool 28 and fault code evaluation program 43 accessing the database via the Internet connection 70.

Although discussed above as including two categories of fault code designations comprising collision and mechanical fault codes, it should be appreciated that fault code evaluation program 43 may be configured to categorize detected fault codes into more than two such categories. For example, fault code evaluation program 43 may categorize fault codes 25 as requiring further investigation, such as to indicate that a given system or electronic component associated with a particular fault code requires inspection to designate it as either a collision or a mechanical fault code. Such inspection may require, for example, an operator to inspect a particular location on vehicle 22 to determine if there is collision damage present, where the location would correspond to where on the vehicle the given system or electronic component associated with the fault code is located. This may be done by operator 24 interacting with diagnostic tool 28 via the screen 66a of tool 28.

Still further, system 10 may additionally operate to automatically categorize at least some fault codes 25 as collision fault codes 25a or mechanical fault codes 25b based on an assessment of damage to vehicle 22. In such a configuration, prior to generating report file 26, diagnostic tool 28 may receive damage data inputs or information regarding damage to vehicle 22, with system 10, such as via fault code evaluation program 43, in turn classifying a given fault code 25 as a collision fault code 25a at least in part if the electronic system or component associated with the fault code is located in an area on vehicle 22 that is physically damaged, such as from a collision. To this end, system 10 may operate to obtain damage information regarding vehicle 22 in like manner to the system of U.S. patent application Ser. No. 17/509,316, which as noted is incorporated by reference herein it its entirety. For example, in the case of a vehicle that has been damaged, system 10 may be additionally operable to receive inputs 14 related to damaged areas of vehicle 22 whereby system 10 takes into consideration the damage and potential vehicle systems and associated ECUs when categorizing fault codes 25, such as illustrated in FIG. 3.

Damage information inputs 14 may be provided to system 10 via one or more various sources. In one configuration, one or more images representative of the particular vehicle 22 being diagnosed may be shown on screen 66a of diagnostic tool 28 where, for example, based on a detected vehicle identification number ("VIN") of vehicle 22, where the VIN may be detected by diagnostic tool 28 from electronic system 23. Diagnostic tool 28 in turn may display an image representative of the make, model and year of vehicle 22. The mechanic 24 may then be prompted to interact with the displayed image, such as with screen 66a being configured as a touchscreen, to designate or highlight on the displayed image the location or locations corresponding to any actual damage on vehicle 22. Alternatively, in another configuration system 10 may obtain digital images or photographs of the actual vehicle 22 requiring repair and, via image recognition software, determine the location or locations of damage on vehicle 22. Such digital images may be provided to system 10 from a separate camera, or for example, diagnostic tool 28 may include an integrated camera or imager, such as a CMOS imager, with which to take digital images of vehicle 22, with image recognition software residing in computer module 30, such as in memory 50. Still further, in yet another configuration system 10 may interface with a collision estimating software program, such as via an API exchange, whereby system 10 may receive a predetermined evaluation of any damage to vehicle 22, including to specific vehicle systems where the damage is present. For example, information regarding physical damage to vehicle 22 may be provided to diagnostic tool 28 from a collision estimating software residing on a separate computer. It should be appreciated that the collision estimating software may alternatively reside on diagnostic tool 28 itself, or be accessed directly via diagnostic tool 28.

Fault code evaluation program 43 may accordingly be configured to process fault codes 25 in combination with damage information inputs 14 to categorize fault codes 25. For example, database 50b may further include information for correlating damage to vehicle 22 to fault codes 25. For example, database 50b may include information related to the physical location of where a given system or electronic component associated with a fault code is located on vehicle 22, such as by make, model and year. Accordingly, based on the damage information inputs 14, database 50b may be used to categorize fault codes 25 as collision fault codes 25a or mechanical fault codes 25b based on the specifics of the damage information inputs 14. For example, if damage information inputs 14 indicate damage to a side area of a vehicle 22, and it is further determined that the vehicle 22 has particular electrical systems or components on the damaged side of vehicle 22, fault code evaluation program 43 may designate an associated fault code 25 as a collision fault code 25a, including if that fault code 25 may have otherwise have been considered a mechanical fault code 25b. Alternatively, fault code evaluation program 43 may directly include sources for evaluating damage information inputs 43, such as a database or lookup table, or such sources may be remotely located and accessed.

As noted, the possible fault codes 25 for a given vehicle 22 may be categorized in a database or lookup table by vehicle make and model, including vehicle year. In one embodiment, diagnostic tool 28 determines or acquires a vehicle VIN from the electronic system 23 upon being connected therewith via diagnostic port 32 as part of the scan of vehicle 22. The vehicle VIN may be used to determine the make, model and year of the vehicle 22, and thereby designate the reference categorized fault codes for all possible fault codes for the vehicle 22, which is in turn used in the processing of the fault codes 25 determined from the scan of the electronic system 23 of vehicle 22 by fault code evaluation program 43. For example, FIG. 5 illustrates a database 50b in which various tables or listings 150i, 150ii and 150iii of reference categorized or designated fault codes are contained designating each of the various possible fault codes for vehicle 22 as either collision designated fault codes 155a or mechanical designated fault codes 155b. It should be appreciated each table or listing 150i, 150ii and 150iii may correspond to a given make, model and year of vehicle. Moreover, although only shown with three such tables or listings, it should be further appreciated that database 50b may contain numerous additional reference designated fault code tables or listings for other makes, models and/or years of vehicles. Still further, although system 10 is noted as obtaining vehicle VIN via electronic system 23, system 10 may alternatively prompt an operator 24 to manually enter the vehicle VIN, or may require an operator 24 to enter or select the make, model and year of the vehicle 22 that is being scanned.

System 10 via fault code evaluation program 43 additionally generates a report or report file 26, as shown in FIG. 3. In the illustrated embodiment report file 26 comprises an electronic file categorizing the fault codes 25 detected from the scan of vehicle 22 that is performed using a diagnostic application 50a, where the fault codes 25 are categorized for example as being either collision fault codes 25a or mechanical fault codes 25b. Report file 26 may be displayed on the screen 66a of diagnostic tool 28. Alternatively or additionally, report file 26 may be stored in memory 50 of diagnostic tool 28, such as for later access or download. Still further, report file 26 may be transmitted to a remote computer, such as computer 64 via the Internet connection 70. Report file 26 may be used by an insurance company or an insurance estimator or adjuster for determining coverage of repairs of a vehicle 22 under an insurance policy. The categorization of fault codes 25 thus aids the insurance provider in covering damage that resulted from a collision, as opposed to other pre-existing or non-collision related issues.

A general exemplary process of use of the above disclosed system 10 is illustrated in FIG. 5. As there shown, diagnostic tool 28 is initially connected with electronic system 23 of vehicle 22 at step 100. Subsequently, at step 102, a diagnostic application 50a is launched to scan the electronic system 23 of vehicle 22 to thereby obtain the fault codes 25 that are present in the various electronic components of vehicle 22. At step 104 the fault evaluation program 43 is launched to process the determined fault codes 25 into categories. Finally, at step 106 a report file 26 is generated reporting the fault codes 25 by categories, such as by either collision fault codes 25a or mechanical fault codes 25b.

Diagnostic tool 28 may, either in addition to the above noted various loaded diagnostic applications or in place thereof, be used to access remotely located diagnostic applications, such as that may reside on remotely located servers 64. This may be done, for example, to avoid the need for obtaining and locally storing and maintaining diagnostic applications on diagnostic tool 28. In the illustrated embodiment, diagnostic tool 28 includes an input/output (I/O) interface 66 for coupling to peripheral devices, such as one or more of a monitor, keyboard, mouse, and the like. In a further illustrated embodiment, the diagnostic tool 28 is implemented as a laptop computer with integrated monitor, keyboard, and mouse.

System 10, in addition to performing scanning operations, may also be used for reprogramming of vehicle 22, such as reprogramming selected ECUs, including reprogramming ECUs based on a determination of particular fault codes.

Although vehicle interface diagnostic tool 28 is discussed above as conforming with the SAE J2534 standard, it should be appreciated that alternatively configured vehicle diagnostic and programming tools may be employed within the scope of the present invention, including alternatively configured tools for alternative types of vehicles, such as alternative classes of vehicles. Accordingly, an interface tool may conform with the ISO 22900 standard, or RP1210 standard, or may operate under the ELM327 command protocol.

As noted, the software and/or hardware of diagnostic and programming tools may be required to be updated to operate with new vehicles and/or enable programming and diagnosing of existing vehicles. In the above noted embodiments the vehicle interface diagnostic tool 28 may be periodically updated via an Internet connection, or may be returned to the supplier for updating, including with regard to hardware updates. This may be done by the supplier of the vehicle interface diagnostic tool 28 whereby the local operator 24 need not spend time attempting to maintain the equipment.

In the illustrated embodiment vehicle interface diagnostic tool 28 is disclosed as including both the fault code evaluation program 43 as well as diagnostic scanning programs 50a. It should be appreciated that alternative arrangements may be employed within the scope of the present invention. For example, program 43 and/or programs 50a may reside on different devices. Still further, although fault code evaluation program 43 and diagnostic scanning programs 50a are illustrated and discussed herein as being separate programs, one or more of such programs may be combined together and operate as subroutines, and/or may represent multiple program files, including multiple program files that operate together, including where various portions or sub-files may reside on the diagnostic tool 28 or computer module 30 and other portions or sub-files reside on a remote computer, such as computer 64.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of diagnosing a vehicle electrical system comprising:
   providing a vehicle diagnostic system comprising a vehicle diagnostic computer tool, wherein the vehicle diagnostic computer tool is configured to be selectively connected to a diagnostic port of a vehicle to be in communication with an electronic system of the vehicle;
   running a diagnostic application program with the vehicle diagnostic computer tool to determine fault codes present in the electronic system of the vehicle; and
   processing the fault codes with a fault code evaluation program to categorize and designate the fault codes into at least one category comprising collision fault codes that are deemed to have resulted from collision damage to the vehicle;
   wherein said processing the fault codes with the fault code evaluation program further comprises processing the fault codes with the fault code evaluation program to categorize the fault codes into at least two categories comprising the collision fault codes and further comprising mechanical fault codes that are deemed not to have resulted from collision damage to the vehicle; and
   further comprising a fault code database of designated fault codes and wherein said processing the fault codes with the fault code evaluation program to categorize the fault codes comprises using the fault code database to categorize the fault codes.

2. The method of claim 1, wherein the database of designated fault codes includes mechanical fault code designations for codes from vehicle sensors predetermined to be mechanical fault codes based on vehicle make and model for the vehicle sensor.

3. The method of claim 1, wherein said fault code database of designated fault codes comprises collision designated fault codes and mechanical designated fault codes.

4. The method of claim 3, further comprising generating an electronic file report, wherein the file report includes a listing of the collision fault codes and the mechanical fault codes by category.

5. The method of claim 4, wherein said generating the electronic file report is done by the vehicle diagnostic computer tool.

6. The method of claim 5, further comprising transmitting the electronic file report from the vehicle diagnostic computer tool to a remote computer.

7. The method of claim 5, wherein the vehicle diagnostic computer tool includes the diagnostic application program and the fault code evaluation program.

8. The method of claim 1, further comprising receiving damage information inputs with the vehicle diagnostic computer tool representative of damage to the vehicle, and wherein said processing the fault codes with the fault code evaluation program to categorize the fault codes further comprises processing the fault codes based on the damage information inputs.

9. A method of diagnosing a vehicle electrical system comprising:
   providing a vehicle diagnostic system comprising a vehicle diagnostic computer tool, wherein the vehicle diagnostic computer tool is configured to be selectively connected to a diagnostic port of a vehicle to be in communication with an electronic system of the vehicle;

running a diagnostic application program with the vehicle diagnostic computer tool to determine fault codes present in the electronic system of the vehicle;

processing the fault codes with a fault code evaluation program to categorize and designate the fault codes as collision fault codes that are deemed to have resulted from collision damage to the vehicle or as mechanical fault codes that are deemed not to have resulted from collision damage to the vehicle;

further comprising a fault code database of collision designated fault codes and mechanical designated fault codes, and wherein said processing the fault codes with the fault code evaluation program to categorize and designate the fault codes comprises using the fault code database to categorize and designate the fault codes; and generating an electronic file report, wherein the file report includes a listing of the collision fault codes and the mechanical fault codes by category.

10. The method of claim 9, wherein said generating the electronic file report is done by the vehicle diagnostic computer tool.

11. The method of claim 10, wherein the vehicle diagnostic computer tool includes the diagnostic application and the fault code evaluation program.

12. The method of claim 9, further comprising receiving damage information inputs with the vehicle diagnostic computer tool representative of damage to the vehicle, and wherein said processing the fault codes with the fault code evaluation program to categorize the fault codes further comprises processing the fault codes based on the damage information inputs.

13. A vehicle diagnostic system for categorizing fault codes in an electronic system of a vehicle, said system comprising:

a vehicle diagnostic computer tool, wherein the vehicle diagnostic computer tool is configured to be selectively connected to a diagnostic port of a vehicle to be in communication with an electronic system of the vehicle and to operate in a mode to diagnose a vehicle;

one or more diagnostic scan programs, wherein the diagnostic scan programs are configured for use in diagnosing the electronic system of the vehicle with the vehicle diagnostic computer tool to determine fault codes in the electronic system of the vehicle;

a fault code evaluation program;

a fault code database of designated fault codes;

wherein said fault code evaluation program is operable to process the fault codes to categorize and designate the fault codes into at least two categories comprising mechanical fault codes that are deemed not to have resulted from collision damage to the vehicle and collision fault codes that are deemed to have resulted from collision damage to the vehicle, and wherein the fault code evaluation program is operable to process the fault codes using the fault code database to categorize and designate the fault codes.

14. The vehicle diagnostic system of claim 13, wherein said fault code database of designated fault codes comprises mechanical fault code designations for codes from vehicle sensors predetermined to be mechanical fault codes based on vehicle make and model for the vehicle sensor.

15. The vehicle diagnostic system of claim 13, wherein said fault code database of designated fault codes comprises collision designated fault codes and mechanical designated fault codes.

16. The vehicle diagnostic system of claim 14, wherein said vehicle diagnostic computer tool is configured to generate an electronic file report, wherein the file report includes a listing of the collision fault codes and the mechanical fault codes by category.

17. The vehicle diagnostic system of claim 13, wherein said vehicle diagnostic computer tool includes said fault code evaluation program.

18. The vehicle diagnostic system of claim 17, wherein said vehicle diagnostic computer tool is configured to receive damage information inputs representative of damage to the vehicle, and wherein said fault code evaluation program is operable to categorize the fault codes based in part on the damage information inputs.

19. The vehicle diagnostic system of claim 13, wherein at least one of said one or more diagnostic scan programs or said fault code evaluation program are located on a remote computer.

20. The method of claim 9, wherein the mechanical fault code designations of the database of designated fault codes comprise fault codes from vehicle sensors predetermined to be mechanical fault codes based on vehicle make and model for the vehicle sensor.

\* \* \* \* \*